United States Patent

[11] 3,600,574

[72] Inventors Donald D. Glaza
Warren;
Arthur D. Block, Farmington, both of, Mich.
[21] Appl. No. 827,086
[22] Filed May 12, 1969
[45] Patented Aug. 17, 1971
[73] Assignee General Motors Corporation
Detroit, Mich.
Continuation of application Ser. No. 692,742, Dec. 22, 1967, now abandoned.

[54] RADIOMETRIC METHOD AND APPARATUS FOR MEASURING AND CONTROLLING FOUNDRY SAND MOISTURE
7 Claims, 9 Drawing Figs.
[52] U.S. Cl. ................................................. 250/45,
250/43.5, 250/83.1, 250/83.3
[51] Int. Cl. ........................................... G01t 1/16,
G01n 23/14
[50] Field of Search ........................................ 250/83.1,
45, 83.3 D, 43.5 D

[56] References Cited
UNITED STATES PATENTS
| | | | |
|---|---|---|---|
| 2,873,377 | 2/1959 | McKay .......................... | 250/43.5 D |
| 3,255,975 | 6/1966 | Malin et al. .................. | 250/43.5 D |
| 3,412,699 | 11/1968 | Culp et al. .................... | 250/43.5 D |
| 3,445,651 | 5/1969 | Starnes .......................... | 250/83.3 D |

*Primary Examiner*—Archie R. Borchelt
*Assistant Examiner*—Morton J. Frome
*Attorneys*—Warren D. Hill, Paul J. Ethington and Jean L. Carpenter ABSTRACT: To measure the amount of water present in foundry sand continuously flowing through a chute, a probe within the chute carries a fast neutron source and a slow neutron detector to detect the amount of water in the sand. A gamma source in the probe and a gamma detector outside the chute measure the sand density. The detector output signals are arithmetically combined to give a signal proportional to percent moisture by weight. The signal may be used to control water addition to the sand.

PATENTED AUG 17 1971

INVENTORS.
Donald D. Glaza &
BY Arthur D. Block

Warren D. Hill
ATTORNEY

INVENTORS.
Donald D. Glaza &
BY Arthur D. Block

Warren D. Hill
ATTORNEY

INVENTORS.
Donald D. Glaza &
BY Arthur D. Block

Warren D. Hill
ATTORNEY

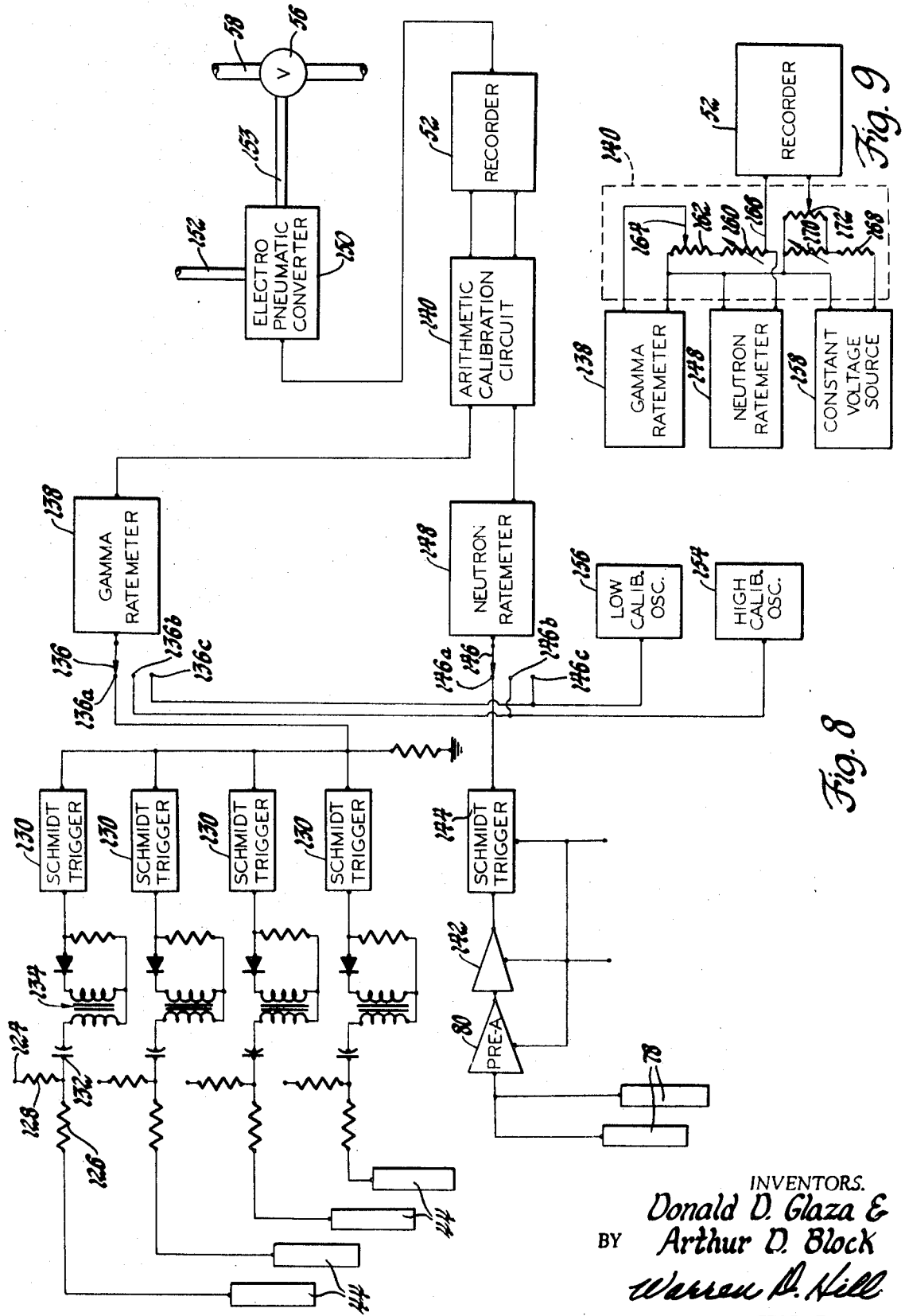

RADIOMETRIC METHOD AND APPARATUS FOR MEASURING AND CONTROLLING FOUNDRY SAND MOISTURE

This application is a continuation of application Ser. No. 694,742, filed Dec. 22, 1967, now abandoned.

This invention relates to a foundry sand moisture gage and particularly to a radiometric moisture gage and controller.

Typically, foundry sand comprises sand mixed with small amounts of clay, seacoal (powdered coal) and water. The water content is critical because a precise amount is required for proper conditioning of the sand and small deviations can result in inferior molds and castings. A typical moisture content would be 2.8±0.05 wO (percent by weight moisture. The foundry sand is provided to the sand line by reclaiming dry sand from used molds, adding sufficient new sand to make up losses in the reclaimed sand and replacing clay, seacoal and water which has been spent in the past process. These materials are added in the form of a slurry mixed with the sand by a muller. The amount of slurry or the water content of the slurry to be added to the sand is determined by an operator who feels the sand coming from the muller and judges its moisture content and controls the rate of water addition accordingly. As a rule, good results are attained by this procedure but often, due to the lack of skill of an operator or due to sudden variations in the moistness of the sand entering the muller, unacceptable departures from the required moisture content result.

It has been proposed in the U.S. Pat. No. 3,213,280 to Burley et al. to measure the moisture content of a fixed mass of sand by inserting a fast neutron source and a thermal neutron detector into the sand mass and measuring the thermal neutron flux which is a direct function of the moisture content. That method has been found to be practical for handling sand in batches. It is often desirable, however, to use continuous sand lines where the sand continuously flows from the spent molds through the remaining operations of cooling, mulling and molding. It has been found, however, that the Burley et al. method, without more, was not directly applicable to such a continuous system because when the neutron source and detectors were immersed in a body of moving sand, the measured thermal neutron flux was no longer a meaningful function of the moisture content.

It is therefore an object of this invention to provide a method and apparatus for measuring the percentage moisture by weight of continuously flowing foundry sand.

It is a further object of this invention to provide a method and apparatus for measuring the moisture content of continuously moving foundry sand and automatically controlling the addition of water or slurry to achieve the desired moisture content.

It is another object of the invention to radiometrically measure the percentage moisture by weight of continuously flowing foundry sand and optionally controlling such moisture content.

It is an additional object of the invention to provide a method and apparatus using neutron sensing of moisture in foundry sand and relating the results thereof to the percentage of moisture by weight of the foundry sand.

The invention is carried out by providing neutron means for measuring moisture present in a moving mass of foundry sand, and by providing gamma transmission density measuring means to determine the density of the sand mass and computer means responsive to the moisture content signal and density signal to provide an output which is a function of the moisture percent by weight.

The invention further contemplates that readout means be provided and if desired, automatic moisture controlling means responsive to the moisture percent by weight output be included.

The invention is also carried out by radiometrically measuring the moisture content in a fixed volume of flowing sand to provide a corresponding output signal, radiometrically measuring the density of the volume of sand to produce an output signal corresponding to density and computing from these signals a final signal which is proportional to the moisture percent by weight of the sand and indicating the computer results. In addition, the invention contemplates automatically controlling the addition of water or slurry to achieve the desired moisture content.

The above and other advantages will be made more apparent from the following specification taken in conjunction with the accompanying drawings wherein like reference numerals refer to like parts and wherein:

FIG. 8 is a circuit diagram of the electrical portion of the moisture gage according to the invention, and;

FIG. 9 is a schematic circuit diagram of the arithmetic and calibration circuit of FIG. 8.

Figure 1:
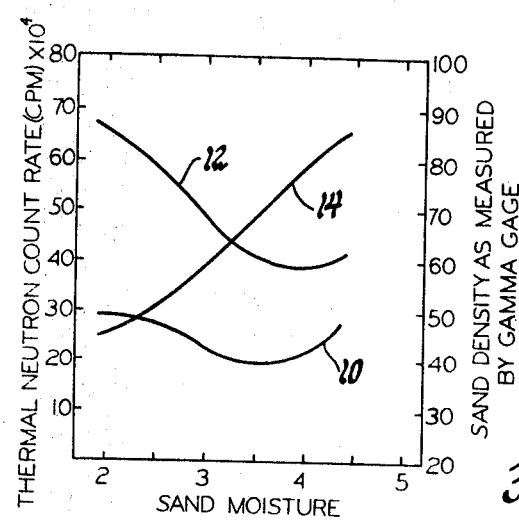
FIG. 1 is a graphical representation of thermal neutron count rate and sand density versus sand moisture.

It is well known that fast neutrons in passing through material lose energy upon collision with the atomic nuclei so that eventually they become neutrons of very low energy or thermal neutrons. Hydrogen nuclei, being the lightest, moderate the neutrons much more effectively than the nuclei of the other elements. As a rule of thumb, where the material contains a substantial amount of hydrogenous material, moderating effects of elements other than hydrogen can be ignored and for a given fast neutron flux it is expected that a thermal neutron flux proportional to the hydrogen content would be produced. Such is usually the case. In the case of foundry sand, in the range of interest, i.e., 2—4 percent w/o moisture, it has been found that the thermal neutron density is not directly related to the moisture content by weight of sand. FIG. 1 illustrates a curve 10 which is the actual results of measurements of thermal neutron count rate plotted against sand moisture percent by weight where the tests were made with a large volume of sand. Thus it can be seen that in the range of 2—3.5 percent moisture, the thermal neutron count rate actually decreases as the moisture increases and then the count rate begins to increase for higher moisture contents. Although not shown, the count rate is a substantially linear function of moisture for moisture content in excess of 10 percent. It has also been found that the density in a fixed volume of foundry sand will vary greatly, particularly in the 2—4 percent moisture region of interest. This also is graphically illustrated in FIG. 1 by the curve 12 which gives the results of actual measurement of sand density. Thus, the density decreases dramatically as moisture increases from 2—4 percent and then begins to increase for higher moisture content. Several features contribute to variations of density in a moving mass of foundry sand. At a fixed content of moisture percent by weight, density will depend upon the size of sand particles and upon the type and amount of clay mixed with the sand and the amount of mulling of the mixture which determines how well the clay is distributed over the surface of the individual sand particles. Moreover, with particular reference to curve 12, the sand is caused to decrease in density as moisture increases because up to a point, the clay, when absorbing water, will swell or expand considerably more than that accounted for by the volume of water added so that a given mass of foundry sand will occupy a large volume and its density will decrease. Consequently, for a fixed volume of sand, the amount of hydrogenous material will decrease as the moisture percent by weight increases. Since in a sand mass the range of thermal neutrons sensed by a detector is fixed, a constant volume of sand is tested even though the total volume of sand increases, thereby explaining why the thermal neutron count rate of curve 10 decreases as the moisture percent by weight increases. It has further been found that the thermal neutron count rate can be adjusted mathematically by taking into account the sand density to provide a normalized thermal neutron count rate as shown in curve 14 of FIG. 1. This curve represents what the thermal neutron count rate would have been had the sand density remained constant at 82.5 lbs. per cubic foot. It is seen that this normalized curve is fairly linear and increases as the moisture percent by weight increases so that the normalized curve can be used as a basis for measurement of moisture content of foundry sand.

Figure 2:
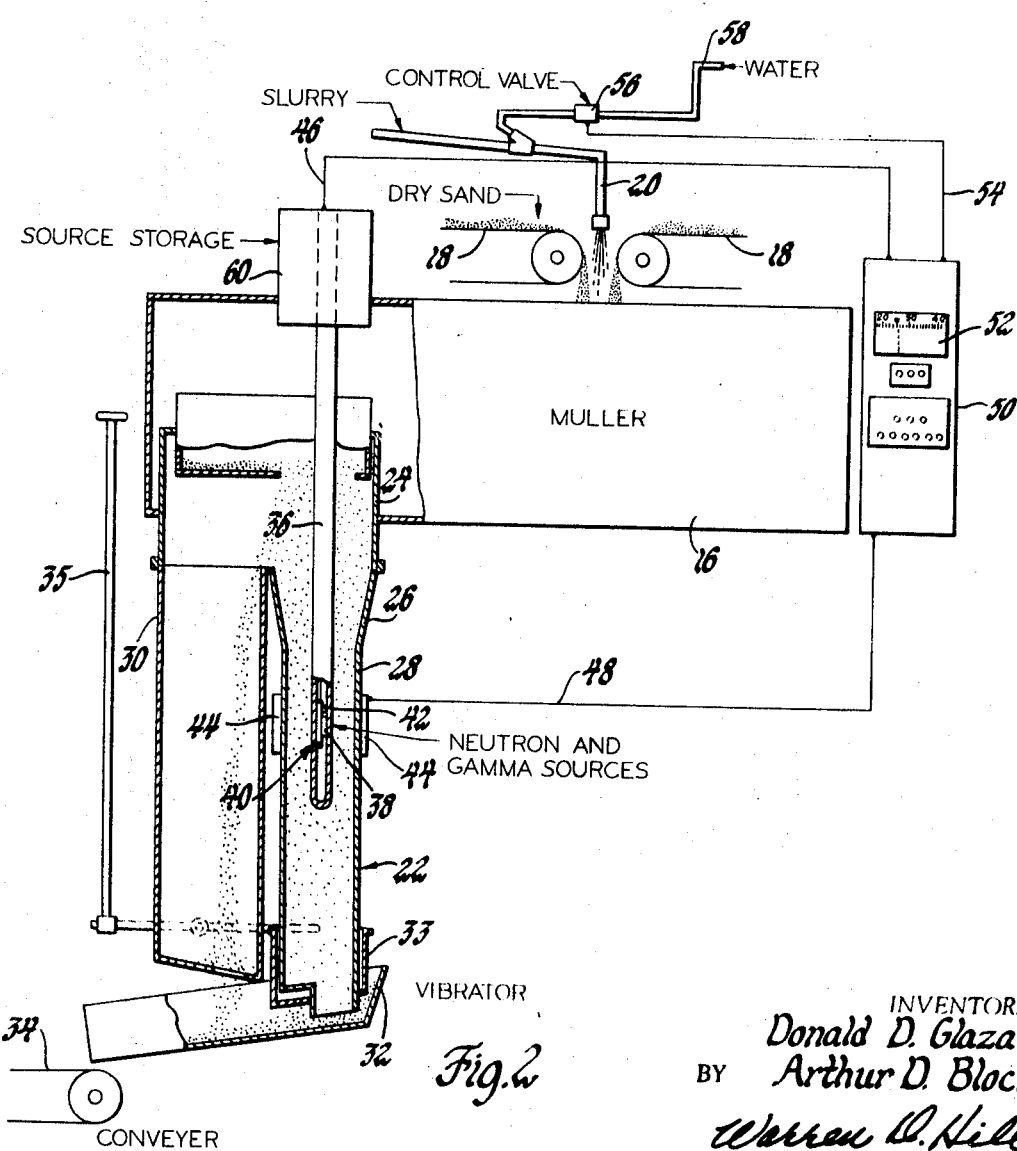
FIG. 2 is a diagrammatic elevational view of a sand system incorporating a moisture gage in accordance with the invention.

FIG. 2 diagrammatically depicts an apparatus for carrying out the measurement process which is based upon the theory discussed above. A sand muller 16 receives dry sand from conveyors 18 and a slurry from pipe 20. The slurry comprises a mixture of clay, seacoal and water in proportions required to make up that lost in previous factory operations. The sand and slurry are then mixed together in the muller and discharged continuously but erratically. To the extent thus far described, the apparatus is conventional. However, according to the invention, the sand discharged from the muller is first passed through a chute 22 which comprises a hopper 24 directly receiving sand from the muller and a funnel 26 which allows the sand to freely pass down to a gaging cylinder 28 of the chute. A secondary spill sand chute 30 is connected to the hopper 24 adjacent the funnel 26 to accept any sand overflow which cannot be accommodated by the gaging cylinder 28. That sand passing through chute 22 falls into a vibrating conveyor member 32 which feeds the sand to a conveyor 34 where it may be transported to molding stations. A gate mechanism 33 at the lower opening of the chute 22 regulates the flow of sand therefrom and is controlled by a hand wheel and shaft assembly 35. A tubular probe 36 is disposed within the gaging cylinder 28 and extends up through chute 22 and is supported from above. The probe contains a fast neutron source 38 and a thermal neutron detector 40 as well as a gamma source 42. Four gamma detectors 44 are mounted on the outside wall of the gaging cylinder 28 and disposed opposite the gamma source 42. The signals from the neutron and gamma detectors are carried by conductors 46 and 48 to measuring, computing and control circuits housed within cabinet 50. A readout device in the form of a recorder 52 is included in the cabinet 50. An output control signal is carried by line 54 to a control valve 56 which meters water passing through pipe 58 to the slurry pipe 20. A source storage container 60 containing biological shielding material for the gamma and neutron sources is mounted at the upper end of the probe 36 to provide a storage place for the sources when they are not in use.

The method of the invention is carried out by continuously passing sand from the muller through the chute 22. The sand flow is regulated so that the sand will fill the gaging cylinder 28 at least from a point 18 inches below the center of the neutron source and detector assembly to a point 18 inches above the assembly because this represents the range of influence of thermal neutrons on the neutron detector. That is, the range of thermal neutrons in the sand mass is so limited that thermal neutrons from points further away from the detector have an insignificant effect on the detector. Thus, since the diameter of the gaging cylinder is fixed, there is effectively maintained a constant volume or zone in which the sand moisture is gaged. Fast neutrons emitted from the source 38 are moderated in proportion to the hydrogenous material within the constant gaging volume or gaging zone to produce a thermal neutron flux which is measured by the thermal neutron detectors 40 to thereby produce a pulsed electrical signal at line 46 having a count rate proportional to the amount of hydrogenous material in the gaging volume. Simultaneously, gamma rays from the gamma source 42 pass through the sand in the gaging cylinder to the gamma detectors 44 and are attenuated by the sand mass so that the electrical signals produced by the gamma detectors have a count rate inversely proportional to the sand density. The neutron and gamma signals are operated upon by an arithmetic circuit or analog computer. The relationship of the signals to the moisture percent by weight is very complex. It has been found for one installation that the following equation is applicable:

Moisture $2/o = 11.464 + 2.831 \ln V_n - 7.628 \ln V_G$ where,
$V_n$ = neutron count rate
$V_G = 344,920 - V_g$
$V_g$ = gamma count rate This equation is readily carried out by an analog computer and will derive the curve 14 of FIG. 1 from the information of curves 10 and 12. It will be found, however, that for any specific installation, the analog computer must be empirically calibrated, which calibration will result in the same equation but with different constants. The constants are effected not only by the characteristics of the electronic equipment used but also by the type and amount of clay used and other variations of the sand composition. It has further been found that for a very narrow range of operation, a single linear equation can be derived to express the moisture content for a particular type of sand. In one installation, the following equation was empiricially derived and determined to be satisfactory:

Moisture $w/o = 0.165 (10^{15}) G + 0.62 (10^{15}) N + 0.68$
where,
$G$ = gamma count rate
and,
$N$ = neutron count rate Regardless of the particular empirical equation used in the analog computer, the output thereof is fed to the recorder 52 for indicating the percent moisture by weight. The muller operator may adjust the rate of water addition to the muller in accordance with the information as shown by the recorder, or alternatively, the computer output signal may be used to automatically control the rate of water addition. As a further alternative, the signal may be used to control the rate of slurry addition.

Figure 3:
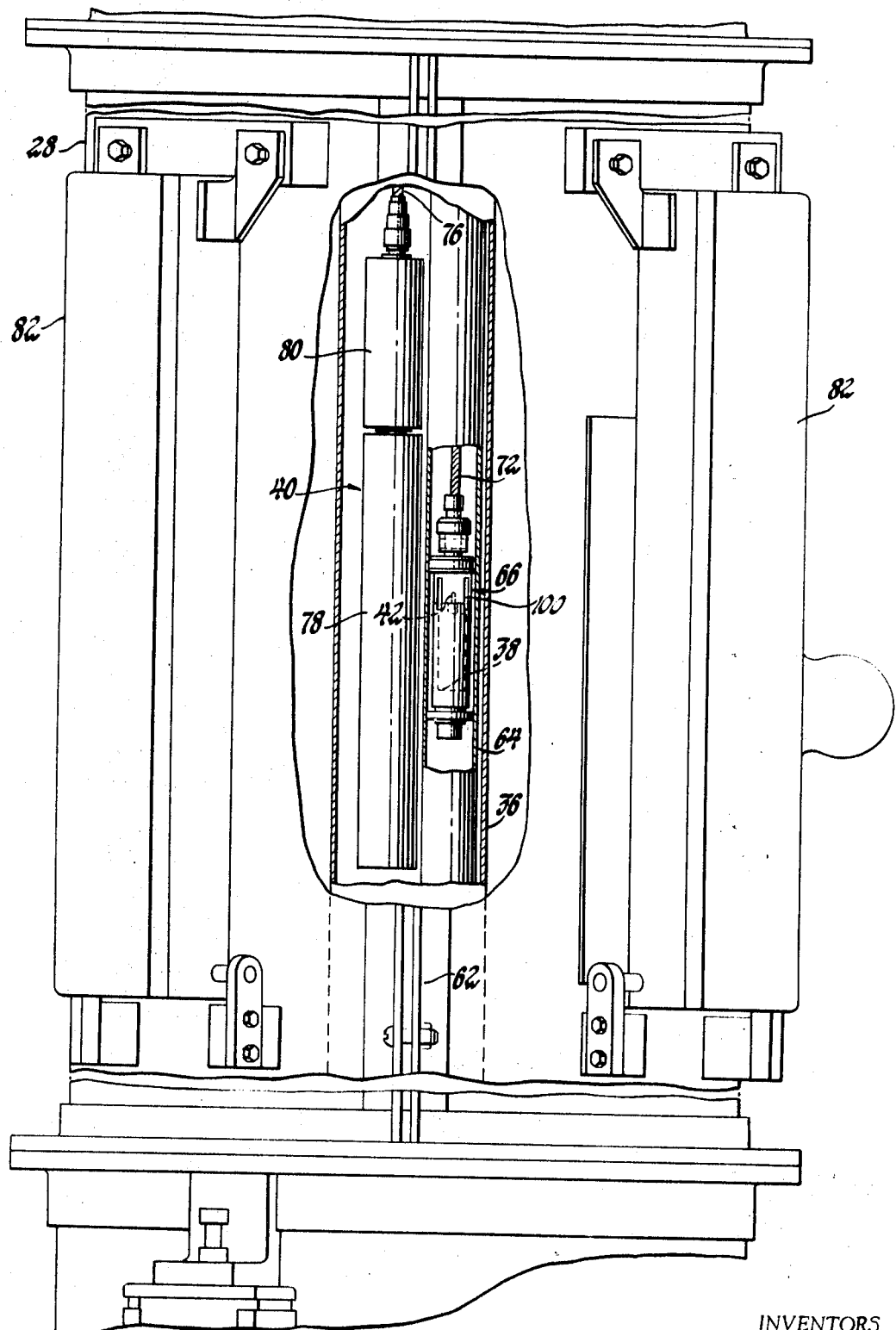
FIG. 3 is a partly broken away elevational view of the gaging cylinder of FIG. 2.
Figure 4:
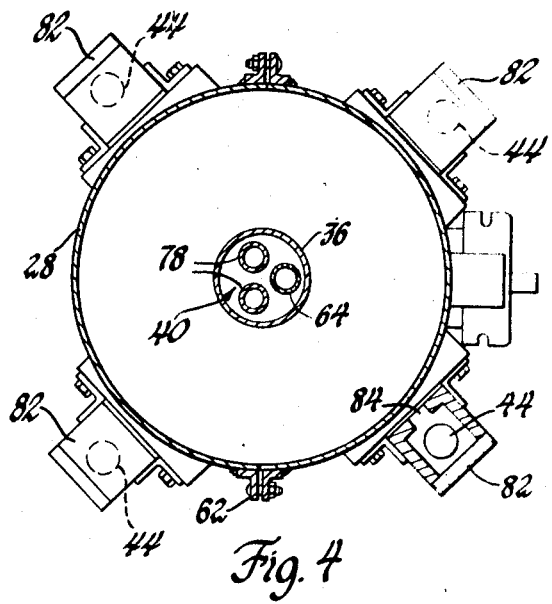
FIG. 4 is a cross-sectional plan view of the gaging cylinder of FIG. 3.

Now considering the mechanical details of the moisture gage, FIGS. 3 and 4 depict the gaging cylinder 28 which comprises a vertically disposed split cylinder secured together by flanges 62 welded to the cylinder halves and bolted together. The cylinder is 4 feet long and 21 inches in diameter. As previously mentioned, the sand mass must extend at least 18 inches above and below the center of the thermal neutron detectors and a 4 foot gaging cylinder has been found to be a convenient size for this purpose. The cylinder diameter is chosen to be large enough to obtain an adequate thermal neutron count rate; large enough to permit an ample flow of sand; and yet small enough to permit an accurate gamma transmission density measurement. The cylinder 28 must have a low friction surface to allow the moving sand to flow freely without causing hang up problems. For this purpose, a polished stainless steel material for the cylinder is preferred although other materials have been found to be satisfactory if coated with a low friction material such as tetra flouro ethylene Teflon. Incidentally, similar materials are used in the remainder of the chute 22 for the same reason. A 5 inch tubular probe 36 also of polished stainless steel is centrally disposed within the cylinder 28. The probe contains another tube 64 which serves as a guide and container for a gamma and neutron source capsule 66 which contains the neutron source 38 and the gamma source 42. The capsule is supported within the tube 64 by a flexible cable 72. A thermal neutron detector 40 is supported by a flexible cable 76 within the probe 36. The thermal neutron detector 40 comprises a pair of proportional counter tubes 78 filled with boron trifluoride, which is as well known, is sensitive to thermal neutrons but insensitive to fast neutrons and gamma rays. The detector 40 further includes a preamplifier 80 mechanically and electrically connected to the detector tubes 78. When in operating position, as shown in FIG. 3, the fast neutron source 38 is aligned with the longitudinal midpoint of the thermal neutron detector tubes 78. Four gamma detectors 44 are mounted on the outside of the gaging cylinder 28 so that the midpoints thereof are horizontally aligned with the gamma source 42. Each detector 44 comprises a self-quenching neon-argon filled Geiger-Mueller tube and is secured within a housing 82 containing substantial shielding material, preferably 1 inch of lead, on all four sides of the detector except for a vertical collimating aperture 84 directly between the detector 44 and the gamma source 42.

Figure 5:
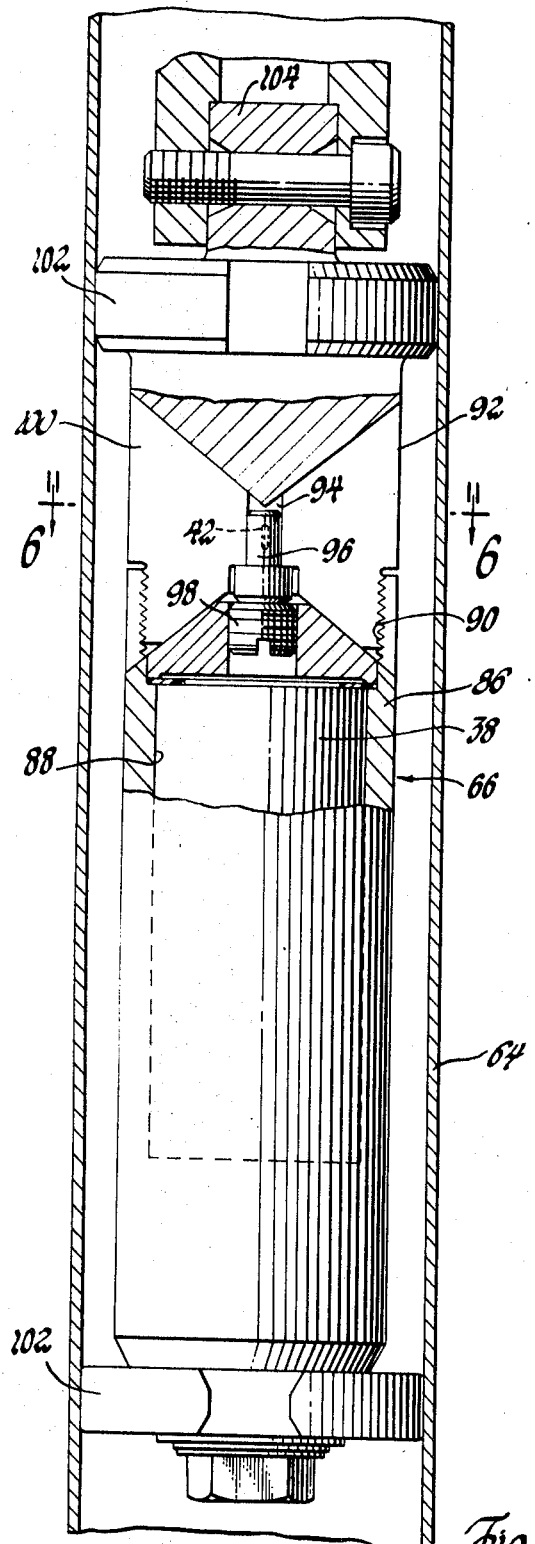
FIG. 5 is a cross-sectional elevational view of the source capsule of FIG. 3.
Figure 6:
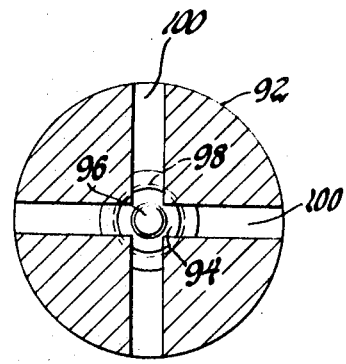
FIG. 6 is a cross-sectional plan view of the source capsule taken through line 6—6 of FIG. 5.

Referring now to FIG. 5, the neutron and gamma capsule 66, comprises a neutron source housing 86 having a cylindrical cavity 88 containing the neutron source 38. The neutron source is a 2-curie plutonium beryllium fast neutron source. The upper portion of the upper end of the cavity 88 terminates in a threaded portion 90 which receives a mating threaded portion of a gamma source housing 92 which contains a cavity 94 for receiving the gamma source holder 96 which is secured in place by a threaded plug 98. The gamma source 42 within the source holder 96 comprises an 11.4 millicurie cesium-137 gamma source. As best seen in FIG. 6, the gamma source housing 92 includes four equally spaced collimating slots 100 radiating from the location of the gamma source 24 thereby providing means for directing collimated fan-shaped beams of gamma radiation to the gamma detectors 44. The source capsule has at either end circular guides 102 for positioning the capsule 66 within the tube 64. The upper guide 102 has a lug 104 formed thereon to cooperate with a yoke and bolt to secure the capsule 66 to the flexible cable 72.

It will thus be seen that the gamma density gage comprising the gamma source and detectors includes careful collimation at both the source and the detector locations so that the device functions as a true gamma transmission gage rather than as a backscatter gage. In the absence of such collimation, gamma rays scattered from matter not directly in line between the source and detectors would be able to reach the detectors and impose a spurious backscatter signal on the gamma transmission signal. This is important since the gamma transmission intensity is inversely proportional to density while the backscatter signal would be directly proportional to density and therefore the two are incompatible. In addition, while the shielding material in the gamma detector housing 82 provides biological shielding in those discrete areas, complimentary shielding in the other areas around the gage cylinder 28 is provided by the solid segments of shielding material of the gamma source housing 92.

It will be noted that the plutonium beryllium fast neutron source 38 emits gamma radiation. This radiation is equal to about 1 percent of radiation from the gamma source 42 and therefore is of small consequence. In addition, fast neutrons from the source 38 and the gamma rays from the source 42 do not significantly effect the operation of the nearby thermal neutron detector 40 so that the source and detectors are compatible.

Figure 7:
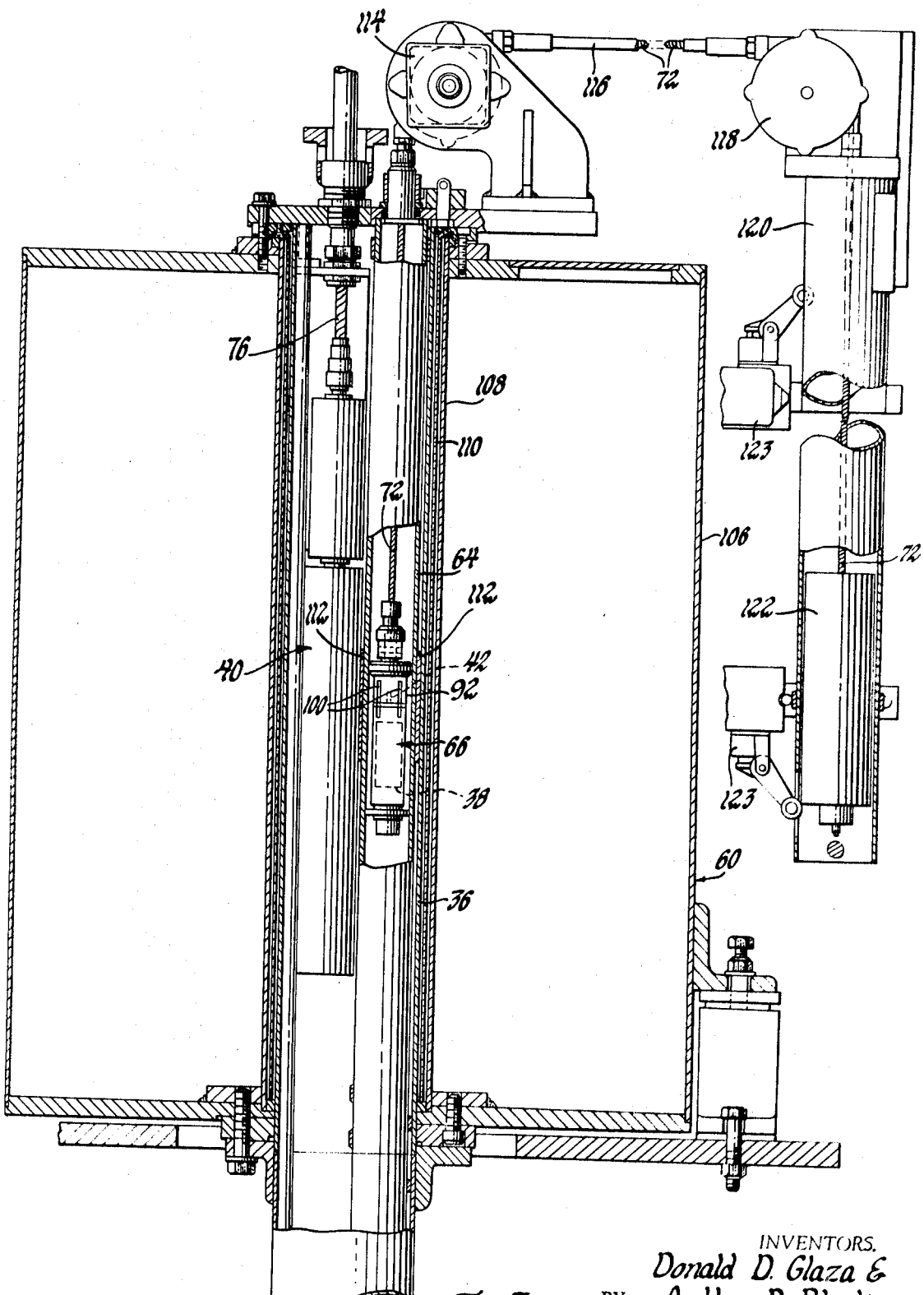
FIG. 7 is a cross-sectional elevational view of source storage mechanism.

The source storage container 60 shown in FIG. 7 comprises a drum 106 having an inner concentric tubular wall 108 defining a cylindrical passageway for receiving the probe 36. The drum is filled with paraffin wax to provide a fast neutron shielding means. A sheet of perforated cadmium foil 110 lies between the outer wall of the probe 36 and the wall 108 to provide thermal neutron shielding means for reducing the thermal neutron flux to a value useful for calibrating the neutron detection system. The source capsule 66 is shown in storage position within the tube 64. Four vertical slabs 112 of shielding material are strategically spaced around the tube 64 and secured thereto so as to form gamma shielding means in line with the slots 100 of the gamma source container 92. The thermal neutron 40 is also shown positioned adjacent the source capsule 66 although the detector 40 is supported by a separate cable. The cable 72 supports the source capsule 66 passing upwardly over a motor operated cable drive mechanism 114. The flexible cable 72 then passes through conduit 116 to a manually operated cable drive mechanism 118 and finally the cable 72 passes down through a cylindrical guide member 120 where it is attached to a weight 122. The weight is heavier than the source capsule so that in order to lower the capsule 66 from the storage position shown in FIG. 7 to operating position shown in FIG. 3, it is necessary to drive the weight by the motor control drive mechanism 114. Limit switches 123 in circuit with the motor contact the weight 122 in its extreme positions to control the locations of the capsule 66 in the shield and in the gage. An electrically controlled clutch, not shown, connects the motor of the drive mechanism 114 to the cable drive wheel so that in the event of loss of electrical power, the motor is disconnected from the remainder of the drive mechanism 114 permitting it to free wheel thereby allowing the weight 122 to fall and pull the capsule 66 to a storage position. Since there is no danger involved in leaving the thermal neutron detector 40 in operating position during an emergency, no failsafe provisions are made and accordingly, any suitable mechanism for operating the flexible cable 76 may be used. The flexible cable 76 is a coaxial cable which provides electrical connections between the detector 40 and the external circuitry.

The electrical circuitry is shown in FIG. 8. There, the Geiger-Mueller tubes 44 are each connected to a terminal 124 capable of supplying 500—1350 volts DC the connection being made through resistors 126 and 128. The junction of those resistors is coupled to a Schmidt trigger 130 by capacitor 132 and the pulse transformer 134, the several Schmidt triggers having their outputs combined and fed to a switch 136. With the switch in normal operating position, engaging terminal 136a, the signal will be connected to a gamma linear rate meter 138, the output of which is connected to an arithmetic and calibration circuit 140.

The neutron detector tubes 78 have their outputs coupled and connected to preamplifier 80. A signal from preamplifier 80 is further amplified and inverted by amplifier 142 and then fed to the Schmidt trigger 144. The pulsed output of Schmidt trigger is connected to terminal 146a and when the switch is in normal operating position, engaging terminal 46a, the signal will be fed to the neutron linear ratemeter 148, the output of which is connected to the arithmetic and calibration circuit. As will be further described below, the arithmetic circuit operates on the gamma count rate signal from the ratemeter 138 and the thermal neutron count rate signal from ratemeter 148 to provide an output proportional to percentage of moisture by weight. This output signal is fed to a recorder 52 which displays the measured moisture content on a strip chart. To achieve automatic moisture control, the moisture signal is fed from the recorder 52 to an electropneumatic converter 150 having an air input line 152 supplying air at 20 p.s.i. and having an output line 153 regulated between 3 and 15 p.s.i. in proportion to the electrical moisture content signal. The line 153 is connected to a pneumatic control valve 56 which regulates the flow of clear water through pipe 58 to thereby control the water content of the slurry. If desired, however, the pneumatic control valve 56 may be inserted in the slurry feed line 20 (FIG. 2) to control the total slurry flow. Calibration instrumentation is provided and includes a high frequency calibration oscillatory 154 connected to terminals 136b and 146b of switches 136 and 146 respectively and a low frequency calibration oscillator 156 is connected to terminals 136c and 146 c of the same switches.

The arithmetic circuit 140 or analog computer is shown in detail in FIG. 9. This circuit comprises a common voltage line connected to outputs on the gamma ratemeter 138, the neutron ratemeter 148 and a constant voltage source 158. A pair of potentiometers 160 and 162 are connected between the output (N) of neutron ratemeter 148 and the common voltage line. The potentiometer 162 has a wiping contact 164 connected to the output (G) of the gamma ratemeter 138. It will be seen that the circuit as described thus far provides means for adding the gamma and neutron count rates in proportions determined by the settings of the potentiometers 160 and 162 so that the voltage output of the circuit on line 166 leading to the recorder 52 will be the sum of the ratemeter outputs as adjusted by the potentiometers. A constant value K is added to the equation by the constant voltage source 158 which is connected through a fixed resistor 168 and a pair of potentiometers 170 and 172 in parallel which provide for a coarse and fine adjustment, respectively. The wiping contact of potentiometer 172 is connected to the recorder 52. The recorder then sees a voltage which is:

$$K_2 G + K_1 N + K = w/o \text{ moisture}$$

where, $K$, $K_1$, and $K_2$ are constants. $K$ is selected by adjusting potentiometers 170 and 172, $K_1$ by adjusting potentiometer 160 and $K_2$ by adjusting potentiometer 162.

As stated before, in one installation it was empirically determined that the constant $K_1$ was 0.165 ($10^{15}$), $K_2$ was 0.62 ($10^{15}$) and $K$ was 0.68. To calibrate the circuit to set these constants, the high and low frequency calibration oscillators 154 and 156 of FIG. 8 are brought into play. These oscillators have fixed frequency outputs of 387,000 counts per minute and 320,000 counts per minute and simulate the outputs of the gamma and neutron detectors. From the above basic equation it can be shown that:

$\Delta w/o$ moisture $= 0.165 \times 10^{15} \Delta G$ (when $\Delta N = O$)
$\Delta w/o$ moisture $= 0.62 \times 10^{15} \Delta G$ (when $\Delta G = O$)

where, $\Delta 2/o$ moisture = Difference between two separate moisture readings $\Delta G$ = Difference between two gamma count rates $\Delta N$ = Difference between two neutron count rates Then both ratemeters 138 and 148 are connected through switches 136 and 146 to the low frequency calibration oscillator 156 and the resulting moisture reading on the recorder 52 is noted. This test is repeated with the gamma ratemeter 138 connected to the low frequency calibration oscillator 156 and the recorded moisture reading is again noted. If the resulting $\Delta w/o$ moisture as indicated agrees with that computed from the known input frequencies to the gamma ratemeter 138 then the gamma potentiometer 162 is properly adjusted. However, if the computed and measured values disagree, the potentiometer 162 should be adjusted until they do agree. Then the neutron potentiometer 160 is calibrated in a similar manner. To calibrate the constant potentiometers 170 and 172, the gamma ratemeter 138 is connected to the high frequency calibration oscillator 154 and the neutron ratemeter 148 is connected to the low frequency calibration oscillator 56. For these input frequencies, the $w/o$ moisture should be 3.28 according to the basic equation; 0.165 ($10^{15}$) $G$+0.65 ($10^{13}$) $N$+0.68. If the recorder does not read out 3.28$w/o$ moisture the potentiometers 170 and 172 are adjusted until the correct reading is established. The constant K is largely a function of the seacoal content of the foundry sand, and when the seacoal content is changed, the constant K must also be changed to compensate therefor since the hydrogen content of the seacoal will otherwise effect the measurement of the moisture content of the foundry sand.

In operation of the apparatus according to this invention, relatively dry sand from reclaimed molds mixed with some new sand is fed to the muller where sufficient slurry must be added to make up the water, clay and seacoal content to the required amount. For example, at a sand flow rate of 150 tons per hour with input sand moisture at approximately 0.8 $w/o$ moisture, 10.75 gallons per minute of slurry is needed to maintain 2.6$w/o$ moisture in the output sand. The sand from the muller is discharged into the gaging cylinder 20. The muller sand output is in a discontinuous manner with plops of sand emerging from the open area in the muller side each time the muller plow passes by. The vibrating conveyor member 32 is adjusted so that the sand moves through the gaging cylinder at a steady rate keeping it full at all times. Excess sand spills over into the spill chute 30 to the conveyor member 32. As the sand moves past the probe 36 in the gaging cylinder 28, fast neutrons from the neutron source 38 are continuously moderated by the hydrogenous content of the sand and detected by the thermal neutron detectors 40. Simultaneously, the density of the flowing sand is continuously monitored by the gamma transmission gage comprising the gamma source 42 and detectors 44. Since the detectors 44 are spaced around the gaging cylinder 22, four fan-shaped sectors of the sand mass are monitored thereby achieving a good representation of the average density of the flowing sand. The outputs of the detectors 40 and 44 are operated upon by the arithmetic circuit 140 to calculate the $w/o$ moisture of the foundry sand and this value is recorded by recorder 52 for use by the muller operator who will manually control the water or slurry addition to the muller in accordance with the moisture reading on the recorder. Alternatively, the moisture signal is used to automatically control the rate of water or slurry addition without the attention of an operator. In this manner, more precise control of foundry sand moisture content is achieved resulting in higher quality molds and castings.

The embodiment of the invention described herein is for purposes of illustration and the scope of the invention is intended to be limited only by the following claims:

We claim:

1. A method for measuring the amount of hydrogenous material in a continuously flowing mass containing both hydrogenous material and nonhydrogenous material comprising the steps of passing the mass through a gaging zone of fixed area, maintaining the gaging zone full of the mass, irradiating said mass with fast neutrons from a source of fast neutrons inserted into the path of said flowing mass in the gaging zone and simultaneously measuring the thermal neutron flux within said mass with a thermal neutron detector inserted into the path of said flowing mass, producing an electrical signal proportional to the thermal neutron count rate, at the same time irradiating the mass in the gaging zone with gamma radiation from a gamma source inserted into the path of the flowing mass and simultaneously measuring the intensity of gamma radiation transmitted through the mass with a gamma detector outside the mass, producing an electrical signal as a function of density of the mass and proportional to the transmitted gamma radiation by integrating the gamma count rate, and continuously electrically computing from the said signals the amount of hydrogenous material in the mass.

2. A method for measuring the amount of water in a continuously flowing mass of foundry sand containing from 2 percent to 4 percent by weight water comprising the steps of passing the mass through a gaging zone of fixed area, maintaining the gaging zone full of the mass, irradiating said mass with fast neutrons from a source of fast neutrons inserted into the path of said flowing mass in the gaging zone and simultaneously measuring the thermal neutron flux within said mass with a thermal neutron detector inserted into the path of the flowing mass thereby producing an electrical signal proportional to the thermal neutron flux, maintaining on each side of the neutron detector along the direction of flow sufficient sand such that the mass extends a distance exceeding the maximum distance from which neutrons thermalized by water influence the thermal neutron flux at the detector, at the same time determining the average density of the mass by irradiating the mass with gamma radiation from a gamma source inserted into the path of said flowing mass and simultaneously measuring the intensity of gamma radiations transmitted through the mass in a direction generally transverse to the direction of flow of the mass with a gamma detector outside the mass, thereby producing an electrical signal which is a function of density of the mass, and continuously computing from the said signals the amount of water in the mass of sand.

3. A method for forming a mixture of water and foundry sand such that it contains an exact predetermined amount of water comprising the steps of drying the sand to the extent that it does not contain more water than that desired, flowing the sand continuously through an irradiation zone of fixed area, maintaining the zone full of the sand, irradiating the sand with fast neutrons from a source of fast neutrons inserted into the path of said flowing sand and simultaneously measuring the thermal neutron flux within said sand with a thermal neutron detector inserted into the path of said flowing sand thereby producing an electrical signal proportional to the thermal neutron flux, at the same time irradiating the sand with gamma radiation from a gamma source inserted into the path of the flowing sand in the irradiation zone and simultaneously measuring the intensity of gamma radiation transmitted through the sand with a gamma detector thereby producing an electrical signal as a function of sand density and proportional to the transmitted gamma radiation, continuously electrically computing from the said signals the amount of water in the sand, and continuously adding water in the amount required to provide the exact predetermined amount desired.

4. Apparatus for measuring the amount of water in foundry sand containing between 2 percent and 4 percent by weight water, said apparatus comprising a cylindrical chute defining a gaging zone of fixed area, means for continuously feeding sand through the chute, means for maintaining the gaging zone full of sand, a probe having a fast neutron source positioned adjacent a thermal neutron detector, means for moving said probe to a position adjacent the center of said chute, said detector producing an electrical signal proportional to thermal neutron flux, a source of gamma radiation in the probe, a gamma radiation detector outside the chute, the detector having an electrical signal as a function of sand density proportional to the intensity of gamma radiation transmitted through the sand, and an arithmetic circuit connected to the said detectors and responsive to the said signals for computing the amount of water in the sand.

5. Apparatus for measuring the water content of foundry sand comprising a cylindrical chute defining a gaging zone of fixed area, means for continuously feeding sand through the chute, means for maintaining the gaging zone full of sand, a probe centrally located within the chute in the gaging zone, means for obtaining an electrical signal which is a function of the amount of water in the sand including means for measuring the approximate water content of the sand comprising a fast neutron source and a thermal neutron detector within the probe so that the detector output is a signal which is a function of the thermal neutron flux which arises from the thermalization of the fast neutrons by the water in the sand; means for producing an electrical signal which is a function of the density of sand flowing through the chute comprising a gamma radiation source within the probe and a gamma radiation detector outside the chute wherein the gamma detector output is dependent on the sand density, and computer means responsive to the said electrical signals for calculating the amount of water in the sand.

6. Apparatus for controlling the percent of moisture in foundry sand comprising controllable means for adding water to the sand, means for continuously feeding sand through a chute, means for maintaining the gaging zone full of sand, a gaging zone including a portion of the chute having a fixed cross-sectional area, neutron source and detection means within the gaging zone and within the chute for producing a signal which is a function of said moisture, gamma source and detection means within the gaging zone for producing a signal which is a function of sand density, computer means responsive to the said signals for calculating the percent of moisture by weight of the foundry sand and producing an output proportional thereto, and means responsive to said output for controlling said controllable means whereby the rate of water addition to the sand is regulated to result in an accurate desired moisture content of the sand.

7. Apparatus for measuring the moisture content of foundry sand comprising a gaging cylinder defining a gaging zone of fixed area, means for continuously flowing sand through the gaging cylinder, means for maintaining the gaging zone full of sand, fast neutron source and thermal neutron detector means within the cylinder for measuring the moisture content of the foundry sand flowing through the gaging cylinder and producing a proportionate electrical output signal (N), a gamma source within the cylinder and gamma detector means outside the cylinder for measuring the density of the sand flowing through the cylinder and producing a corresponding electrical output signal (G), and circuit means for calculating from the electrical signal the percent of moisture by weight of the foundry sand which equals the product of a first constant and the signal (G) plus the product of a second constant and the signal (N) plus a third constant, where the constants are empirically determined.

PO-1050
(5/69)

UNITED STATES PATENT OFFICE
CERTIFICATE OF CORRECTION

Patent No. __3,600,574__   Dated __August 17, 1971__

Inventor(s) __Donald D. Glaza and Arthur D. Block__

It is certified that error appears in the above-identified patent and that said Letters Patent are hereby corrected as shown below:

Column 1, line 6, "694,742" should be -- 692,742 --; line 14 "wO" should be -- w/o --; same line, "weight" should be -- weight) --. Column 3, line 33, "That" should be -- The --. Column 4, line 10, "2/o" should be -- w/o --; line 27, "$10^{15}$" (both occurrences) should be -- $10^{-5}$ --; line 59, insert parentheses ( ) around the word "Teflon". Column 5, line 69, after "neutron" insert -- detector --. Column 7, lines 13, 14, 21, 22 and 46, "$10^{15}$" should be -- $10^{-5}$ --; line 23, "2/o" should be -- w/o --; line 47, "$10^{13}$" should be -- $10^{-3}$ --.

Signed and sealed this 5th day of December 1972.

(SEAL)
Attest:

EDWARD M. FLETCHER, JR.
Attesting Officer

ROBERT GOTTSCHALK
Commissioner of Patents